May 25, 1971  H. A. IMHOF  3,579,694
AUTOMATIC SHOE MACHINERY AND OPERATION OF THE SAME
Filed June 2, 1969  8 Sheets-Sheet 1

Inventor
Herman A. Imhof
By his Attorney
Cornelius A. Cleary

United States Patent Office 3,579,694
Patented May 25, 1971

3,579,694
AUTOMATIC SHOE MACHINERY AND
OPERATION OF THE SAME
Herman A. Imhof, Hamilton, Mass., assignor to
USM Corporation, Boston, Mass.
Filed June 2, 1969, Ser. No. 829,307
Int. Cl. A43d 25/00; A43b 13/00
U.S. Cl. 12—17                                    17 Claims

ABSTRACT OF THE DISCLOSURE

A through feed finishing machine designed to provide an operation such as sole reduction on defined margins or edges of an unattached shoe sole initiated relative to the ball point of the sole. The machine includes pairs of finishing tools, for example, rotatable reducing tools mounted in biased relationship to operate on opposite sides of a sole. Pressure equalizing means are mounted opposite each of the tools to assist in keeping the sole moving along a path of travel through the machine and insure uniform finishing by each of the tools during the finishing operation of the lengthwise margins at predetermined points defined relative to the ball points of the sole. The sole is urged through the machine by drive rolls and is stabilized by holddown rolls acting in pairs.

The present invention relates to shoe machines and particularly to machines which operate on the margins or edges of unattached shoe soles.

Various operations of a finishing nature, are carried out on margins or edges of unattached shoe soles. These include reduction, roughing, cement or primer deposition, etc. with respect to margins, and, trimming, burnishing, inking, etc. with respect to edges. For convenience the term margin(s) is itended to include edge(s) as well, and, the invention will be described with emphasis on reduction of unattached soles, whereas other finishing operations are intended as well.

Reduction of the margin of a shoe sole, which may be also considered a bevelling or skiving of sole edges is particularly desirable in cement type women's shoes. At least two important benefits are attainable from the operation. The first contributes to appearance, giving the finished shoe a lighter and more attractive appearance. The second involves utility; reduced margins render the soles more flexible facilitating improved adhesive bonding during manufacture, as well as bond retention by reducing the stress on that bond during later wearing.

Reduction as previously practiced on automatic machines, has been singular in nature, in that the entire margin of the sole to be reduced is done so by a single uniform bevel on a single pass through the machine.

The more desirable type of sole reduction, however, is that in which the sole is reduced to a greater extent or depth at selected margin portions, specifically, in the margin portions running aft relative to the ball points of the sole. The ball points are those points at either edge of the sole which terminate the ball line of the sole. In this manner, even greater flexibility is obtained, and, strain potential to adhesive bonding is reduced in the arch and following portions of the sole. In this respect the reduction, which may be referred to as selective reduction, is assessed relative to extent or depth in a sole which is either (a) not reduced in its other margin portions, to wit: forepart portions or (b) is reduced to the lesser extent in the remaining, forepart margins. The latter has reference to the reduction result which may be obtained in a multiple reduction in which the operation providing the singular reduction of the nature previously described is first practiced on the sole, and, following that, the sole is provided with a second reduction of the selective type. The desirability for providing this selective type of reduction is evident. It provides greater flexibility in the arch portions of the sole, and, the narrower portions, arch and after portions of the sole which must accept comparable amounts of upper material when assembled have more marginal space in which to do so, contributing to improved appearance in the finished shoe.

Heretofore selective reduction, and, as well finishing of soles of the type described has not been achieved in practice by automatic machines. Either hand work or cutting adjustment control has had to be practiced in order to accomplish the same.

It is an object of the present invention to provide a machine capable of finishing selected marginal portions in the arch and heel of an unattached sole of any size or style in a single pass through the machine.

It is another object of the present invention to provide a machine capable of automatically introducing selected finishing in margin portions of an unattached sole the margin portions running aft from the ball point of the sole, and, to do so in a single pass through the machine.

It is another object of the present invention to provide a machine of a through feed nature for finishing the selected margin portions of an unattached sole during a single pass of the sole through the said machine.

These and other objects of the invention are provided in a through feed machine for finishing selected margins or margin or marginal portions of unattached shoe soles. The subject machine includes pairs of rotatable, finishing tools mounted in biased relationship to operate on opposite sides of a sole. Each pair of finishing tools may be considered relative to a machine or finishing operation, station, stage or step carried out with respect to a sole being passed through the machine. Pressure equalizing means are mounted opposite each of the tools to assist in keeping the sole passing along a predetermined path or line of travel through the machine and insure uniform finishing by each of the finishing tools. At least one set of the finishing tools cooperates with actuating means constituting sole edge gage and tool guard disposed to initiate a selected finishing of the lengthwise margins at predetermined points defined relative to the ball point of the sole. The sole is urged through the machine by drive rolls and holddown rolls acting in pairs.

The present invention may be considered as an improvement on the invention disclosed in U.S. application Ser. No. 632,046 filed Apr. 19, 1967, now U.S. 3,435,474, relative to automatic edge finishing machines and a utilization of the invention disclosed in U.S. application Ser. No. 702,283, filed Feb. 1, 1968 relating to reducing tools. In accordance with that it is intended that the disclosures contained in those applications be incorporated herewith by reference.

For purposes of convenience only the following description of the machine is in terms of sole reducing or reduction which is specific to sole finishing.

Feeding of the subject machine may be conveniently accomplished using an automatic stack feeding device of the type disclosed in the earlier referred to application Ser. No. 632,046. The operator places a stack of unattached soles in the feeder with the side of each of the soles on which, for example, reduction is to be carried out, facing downwardly, and the toe of each of the soles facing into the machine. The feeding device automatically orients each sole, as introduced into the machine, such that a line passing along the heel-toe axis will travel along the path of travel of the machine. The feeding device also sequentially and individually feeds the sole at appropriate time intervals to avoid jamming or overlapping of the soles as they are passed through the machine and particularly various reducing operations of the same.

After feeding is initiated the sole is passed through the machine, and similarly the reduction operation or operations or stages of the machine. Each of the operations is achieved on a through feed principle and independent of another or other operations which may be incorporated in the machine. The sole as it passes through the various operations is maintained in the orientation imparted to it by the feed mechanism, through the use of sole feeding means, specifically, advance rolls together with pressure equalizing means. The advance rolls move the sole between and through the various operations. Each set of advance rolls include a knurled roll and a backing or backup roll in paired relationship. Preferably, the advance rolls are located along the path of travel of the sole at a distance or distances less than the length of the shortest sole to be reduced. The sole passes between the pairs of advance rolls and is urged along at a constant speed, being under the control of one of these pairs of rolls at all times. The pressure equalizing means are mounted opposite to each reducing tool, and bear against the side of the sole opposite to that being reduced by the tool. In doing so they counteract resist or equalize the pressure directed laterally against the sole by the reducing tools, and, as a result serve to maintain the sole moving along the designated path of travel. Lengthwise flexing of the sole may be simultaneously minimized by stabilizer rolls positioned along the path of advance of the machine.

The machine includes a pair or a plurality of pairs of rotatable reducing tools. Each tool is independently driven and comprises a shaft carrying both a driven abrasive wheel or disk, and a guiding wheel or disk spaced from the driven wheel for guiding the sole margin against the abrasive surface. The tools are designed to reduce the margin of the sole at a predetermined angle and to a predetermined marginal width. Further details with respect to specific rotatable tools of this type may be found in the previously referred to application Ser. No. 702,283.

In order for each of the reducing tools of a given pair to operate on opposing sides of a sole, they are mounted at opposite sides of the designated path of travel for the sole through the machine. Additionally, the tools of a given pair are in biased relationship. To facilitate this, and provide for overlapping strokes, the reducing tools are mounted on inwardly urged, biased arms. Then to maintain the sole passing through the machine on the predetermined path of travel, and offset the inwardly and actually sidewise urging pressure initiated by the tools on the sole, pressure equalizing means, as previously indicated, are mounted opposite to each of the reducing tools.

The machine may be adapted to provide selective or selected reduction as a single operation in multiple operations set up in the machine. A prime example is the machine set up to provide multiple reductions specifically, two in number, in a single pass, with one of the reductions being of the selected type. In doing so two pairs of reducing tools are used. The preferred practice when practicing the multiple type reduction involves use of a machine embodiment in which the first pair of tools are designed in the manner set forth in the previously identified Patent No. 3,435,474, to introduce single reductions over substantially the entire longitudinal margins, actually substantially the entire peripheral margin, of an unattached sole passed through the same. The second pair of tools then are designed to introduce selective reductions on selected margins or marginal portions of the same sole, the selective reductions being on selected margins running aft, from initiation relative to the ball points of the sole.

In the embodiment referred to, the first pair of reducing tools, between which the sole passes, provide a first or single reduction over essentially an entire longitudinal margin on both sides of the sole. The sole is thus exposed to the reducing tools over the entire length of the sole to which reducing is to take place. The then singly reduced sole is then urged or directed along the path of travel and between the second pair of reducing tools. The second pair of tools are designed to provide a second, selective reduction of the margin, already singly reduced, at the arch and heel portions of the sole. The second, selective reduction is initiated relative to the ball point of the sole, and is effected through provision of each of the second pair of reducing tools with an actuating means constituting a cooperating sole edge gage and displaceable tool guard. Acting cooperatively with the tool and gage, the tool guard serves to maintain or retain the tool out of effective, reducing or cutting contact or position with the sole, over a predetermined length of the same, and specifically over the forepart portion of the sole. When the edge gage registers with the ball point of the sole, the guard responds to the gage and becomes displaced allowing the tool to pass inwardly and into cutting contact with the selected portion of the margin to provide a second and selective reduction of following marginal portions of the sole, e.g. marginal portions on the arch and heel of the sole. After the sole passes through the second pair of reducing tools, the guard is reactivated to take the tool out of effective reducing or cutting contact with the next following sole and at the same time carry the edge guide into position where it may be contacted by the sole edge at the toe of the next following sole.

Pneumatic and mechanical means are provided to initiate the operation and to insure proper time sequence for the multiple reducing operations.

The features of the invention including various novel details of construction and combinations of parts will be described with reference to the accompanying drawings, in which.

The intermediate and final results which may be obtained by directing an unattached sole through one embodiment of the machine of this invention in which the sole is subjected to double reduction are illustrated sequentially in FIGS. 1–9.

Figure 1:
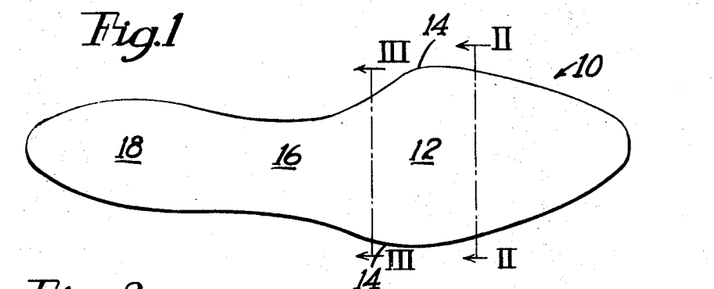
FIG. 1 is a plan view of an unattached sole.
Figure 2:
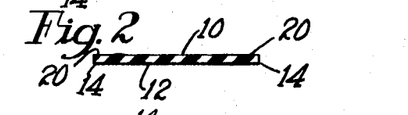
FIG. 2 is an elevation view in section viewed along the line II—II of FIG. 1.
Figure 3:
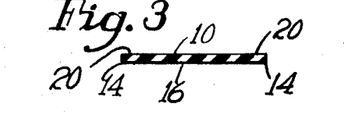
FIG. 3 is an elevation view in section viewed along the line III—III of FIG. 1.

FIGS. 1–3 show a sole 10 as fed, including forepart 12, ball points 14—14, arch portion 16 and heel portion 18. As indicated at FIGS. 2 and 3, sole 10 is of constant thickness, with the marginal portions 20—20 extending outwardly in that manner.

Figures 4, 5, 6:
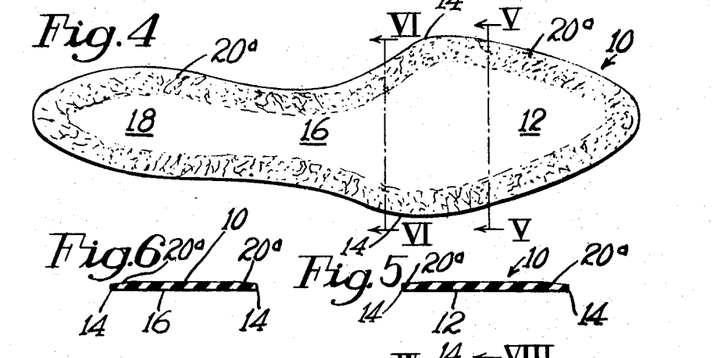
FIG. 4 is a plan view of a singly reduced unattached sole, the reduction extending over essentially the entire periphery of the sole.
FIG. 5 is an elevation view in section viewed along the line V—V of FIG. 4.
FIG. 6 is an elevation view in section viewed along the line VI—VI of FIG. 4.

FIGS. 4–6 represent sole 10 after a single reduction has been carried out over essentially the entire peripheral margin of the same. As indicated particularly in FIGS. 5 and 6 the margin 20a is reduced to a level or scarf of uniform size, width, angle and depth over essentially the entire marginal portion 20a of the sole 10.

Figure 7:
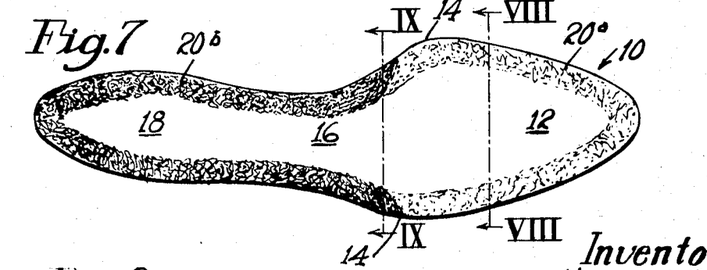
FIG. 7 is a plan view of a multiply reduced unattached sole including a single reduction extending over essentially the entire periphery of the sole, and a second, selective reduction extending over selected margin portions in the arch and heel portions of the sole.
Figure 8:
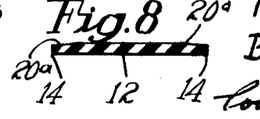
FIG. 8 is an elevation view in section viewed along the line VIII—VIII of FIG. 7.
Figure 9:
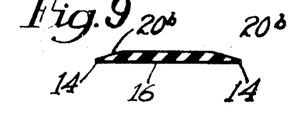
FIG. 9 is an elevation view in section viewed along the line IX—IX of FIG. 7.

FIGS. 7–9 show the sole 10 after multiple reduction has been carried out with respect to it. The second reduction 20b, which is of the selective type, initiates at the ball points 14—14 and runs aft from there. The profile difference between the single and double reduction may be noted by comparing the illustration of FIG. 8, where simple reduction is represented at marginal portion 20a with that of FIG. 9 where the second reduction is represented at marginal portion 20b, both carried on a single sole 10.

Figure 10:
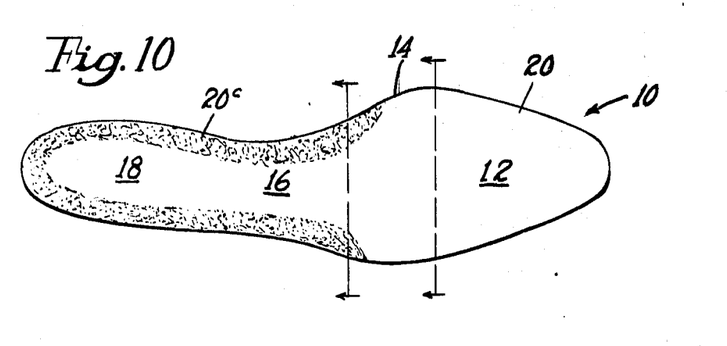
FIG. 10 is a plan view of a singly reduced unattached sole, the reduction being selective in nature extending over selected margin portions in the arch and heel portions of the sole.
Figure 11:
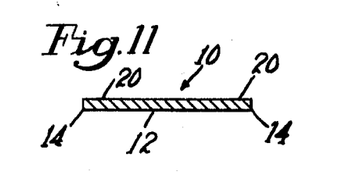
FIG. 11 is an elevation view in section viewed along the line XI—XI of FIG. 10.
Figure 12:
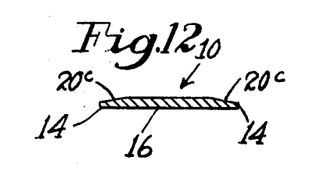
FIG. 12 is an elevation view in section viewed along the line XII—XII of FIG. 10.

The results which may be obtained by directing an unattached sole through a second embodiment of the machine of this invention in which the sole is subjected to a single reduction of the selective type, are illustrated in FIGS. 10–12.

FIGS. 10–12 shows sole 10 after single reduction of the selective type with the reduction 20c initiated relative to the ball points 14—14 and running aft from the same over the arch portion 16 and heel portion 18. As indicated specifically at FIGS. 11 and 12, the forepart portion 12 does not include a reduced margin, but the arch portion 16 and heel portion 18 both do, in the nature of a single, selective reduction 20 initiating relative to ball points 14—14.

Figure 13:
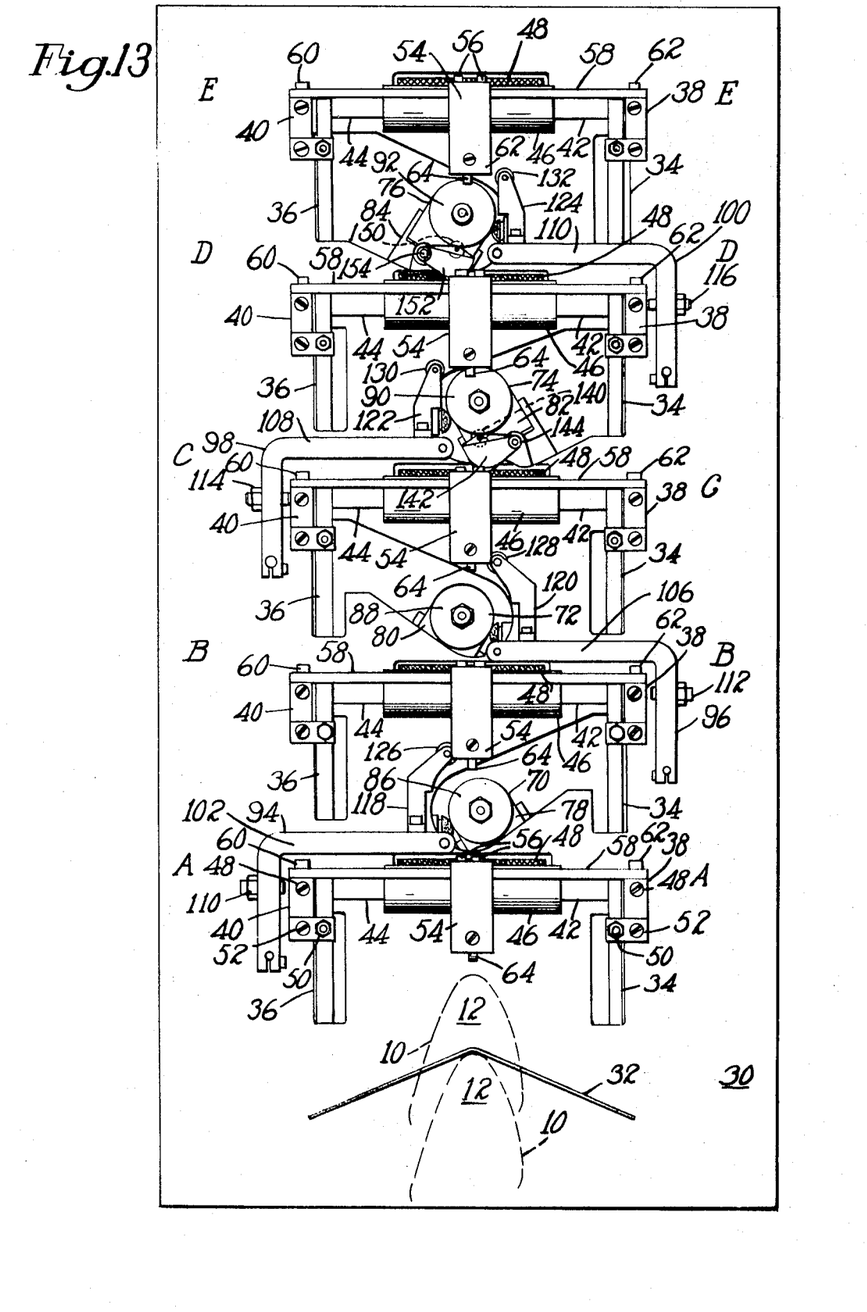
FIG. 13 is a partial plan view, with parts broken, of the finishing machine; adapted for double reduction of soles shown in phantom.

Referring now to FIG. 13, the finishing machine illustrated there is adapted to provide a double reduction, and includes a plate 30 for supporting the soles 10 to be directed through the reducing operations of the machine, on a path of travel indicated by a dashed line. A stack of soles 10 are shown positioned on plate 30 behind V-shaped gate 32 which is part of an automatic feeding device mounted on plate 30 and located at the initiating end of the machine. Stacking is with the soles 10 on which reduction is to be carried out facing downward, and the foreparts 12 leading or facing into the machine. Soles 10 are introduced into the machine by being urged forward singly and at proper interval through a slot, not shown, provided at the bottom of gate 32 using an automatic mechanism, not shown. In this manner soles 10 are introduced into the machine oriented such that a line passing through the heel-toe axis will travel along the path of travel of the machine.

Mounted on plate 30 in sequence are a plurality, five, advance roll stations A–E, each including a pair of brackets 34 and 36 attached to plate 30. The brackets in turn include bearing portions 38 and 40, into which roll shafts 42 and 44 for backing rolls 46 are fitted. Advance rolls 48 which actually urge a sole 10 through the machine, are stationed below cooperating backing rolls 46 in paired relationship. The advance rolls, which are knurled, driven and connected into bearing portions 38 and 40 by shafts, not shown, are wider in diameter than backing rolls 46. In order to adjust the pressure across the rolls a number of adjustment cap nuts 49, 50 and 52 are included.

A number of stabilizing devices 54 for minimizing flexing in the sole 10 are positioned at each of the advance roll stations. These are mounted by bolts 56 into spanning members 58 which are in turn attached at their ends by bolts 60 and 62 onto the bearing portions 38 and 40 of brackets 34 and 36. Each of the stabilizing devices 54 includes a free riding press down roller 64 for contacting the sole 10, and thus stabilizing sole 10 by minimizing longitudinal flexing of the same.

The finishing machine includes two pairs of rotatable reducing tools, a first pair 70 and 72, and a second pair 74 and 76. The tools are each mounted on movable arms 78, 80, 82 and 84. The arms 78–84 are each tensioned to move inwardly on a baised and transversal fashion, one each from each pair on either side of path of travel for a sole 10 passing through the machine. Each of the reducing tools 70–76 includes reducing heads 86, 88, 90 and 92 projecting upwardly through the plate 30, and rotatively driven by individual air motors, not shown.

Mounted in a manner so as to exert a pressure on the sole, in a transversal direction and opposite to that introduced by reducing tools 70–72–74 and 76 are an equal number of pressure equalizing means, 94, 96, 98 and 100. Each includes a tensioned, main pivot arm 102, 104, 106 and 108, respectively; having longitudinally extended therefrom edge pressure asserting wheels, not shown. Also included on the main pivot arms 102, 104, 106 and 108 are adjustable, transversal inward movement stops 110, 112, 114 and 116, respectively. The main pivot arms 102, 104, 106 and 108 also carry laterally extending yoke pieces 118, 120, 122, 124 mounting sole edge pressure asserting wheels 126, 128, 130 and 132, respectively. Each of the yoke pieces 118, 120, 122 and 124 carry a tool bumper, 134, 135, 136 and 137, respectively.

The second pair of reducing tools 90 and 92 are designed to introduce the second, selective reduction initiating at the ball points 14 of the insole 10. Facilitating this, each of the tools 90 and 92 is provided with cooperating actuating means comprising in the first instance a sole gage 140 in the form of a roll or wheel adapted to register on the edge of the sole 10, and a displaceable tool guard 142 in the form of a toe for maintaining the reducing tool 90 out of reducing or cutting contact with the sole 10 over a selected marginal portion of the same. As shown, sole gage 140 is mounted on tool guard 142, and the latter is in turn mounted pivotally at pin 144 on biased arm 82 which also carries rotatable reducing head 90. The assembly is designed to operate on the right side, as viewed, of outsole 10 passing through the machine. The assembly with respect to reducing tool 92 is similar for the adaptation to operate on the opposite or left side of outsole 10. In doing so sole edge gage or guide 150 and tool guard 152 are mounted pivotally at pin 154 onto biased arm 84.

Figure 14:
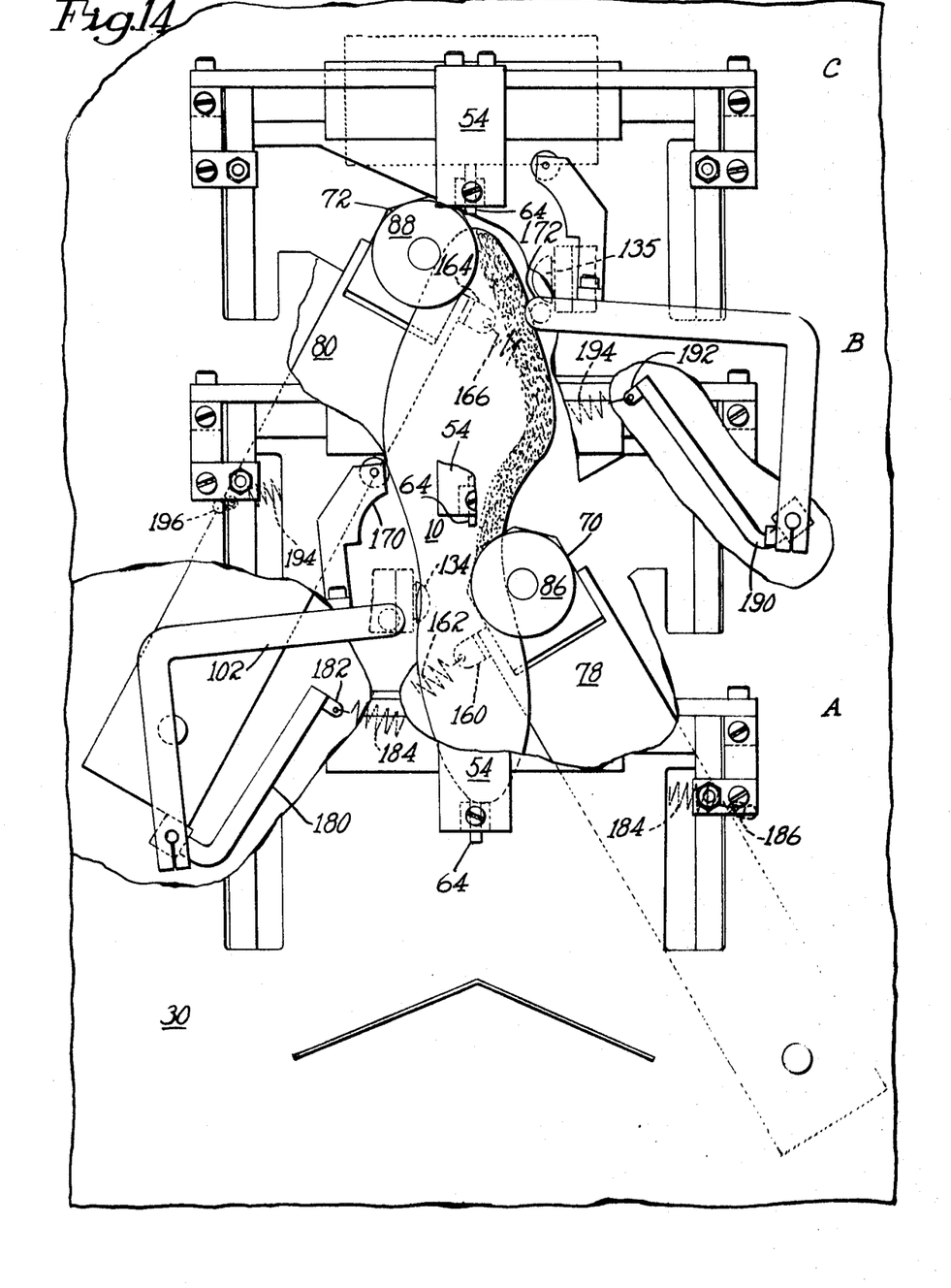
FIG. 14 is a partial plan view, with various parts broken away, others in phantom and others by representation, showing a first pair of reducing tools in a double reduction adaptation of the finishing machine operating relative to an unattached sole.

The drawing in FIG. 14 indicates the intermediate section of the machine where a first reduction in a double reduction embodiment of the machine is carried out relative to the unattached sole 10. This first reduction is designed to be carried out over essentially the entire longitudinal margin, both sides of the sole 10 and, the first pair of rotatable tools 70 and 72 are designed to effect that. These tools are mounted on movable, biased arms 78 and 80. The arms are tensioned as by spring loading to urge inwardly. The spring tension is set, however, to allow the arms to be pressed outwardly, following the edge contour of a sole 10 as it advances between tools 70 and 72. To facilitate spring loading, arm 70 carries a clip 160 to which spring 162 is attached. The opposite end, not shown, of spring 162 is attached to a counterpoint on a stable frame member of the machine, not shown. A similar arrangement, opposite in effect, in order to operate on the opposite edge of sole 10, utilizes clip 164 in attaching spring 166 to arm 80 of tool 72.

As indicated in the drawing there, the reducing operation with respect to tool 70 has advanced to the arch of the sole, while the operation with respect to tool 70 is just initiated.

Located opposite to reducing tool 70 is pressure equalizing means 94. FIG. 14 shows the second edge pressure asserting wheel 170 carried on main pivot arm 102 of equalizing means 94. The use of two edge pressure asserting wheels 126 and 170 on the pressure equalizing means insures that pressure is exerted against the sole and counter direction to that exerted by tool 70 at all times as the sole 10 passes, in spite of the profile shape and length of the sole. A similar arrangement is utilized with respect to pressure equalizing means 96, used to equalize the sidewise pressure generated by reducing tool 72 on sole 10. In this instance the second edge pressure asserting wheel 172 acts in conjunction with edge pressure asserting wheel 128.

Pressure equalizing means 94 and 96 are tensioned by spring loaded to provide equalizing pressure on the opposite edge of sole 10 to the extent sufficient to offset the pressure generated by rotatable tools 70 and 72 transversal to the sole. Without this the sole 10 would tend to move to the side and off the designated path of travel. In the first instance pressure equalizing means 94 is provided with a spring arm 180 located rearward of main pivot arm 102. The spring arm is in turn provided with a spring attaching clip 182 to which spring 184 is attached. The spring 184 is anchored at a counterpoint at the opposite side of the machine. A similar arrangement obtains with respect to pressure equalizing means 96. The main pivot arm 104 carries a spring arm 190 rearward of the same. Spring clip 192 facilitates attachment of spring 194 at one of the same and the opposite end of spring 194 is attached at anchor point 196.

Yoke pieces 118 and 120 of pressure equalizing means 94 and 96 carry attached bumper members 134 and 135 respectively, which serve as strike surfaces for the opposing tools 70 and 72 and prevent the latter from operating over, laterally considered, the path of travel. This is particularly a concern, at the time the leading tip, toe, approaches and the final end or heel end, of the sole 10 passing this point in the machine.

Figure 15:
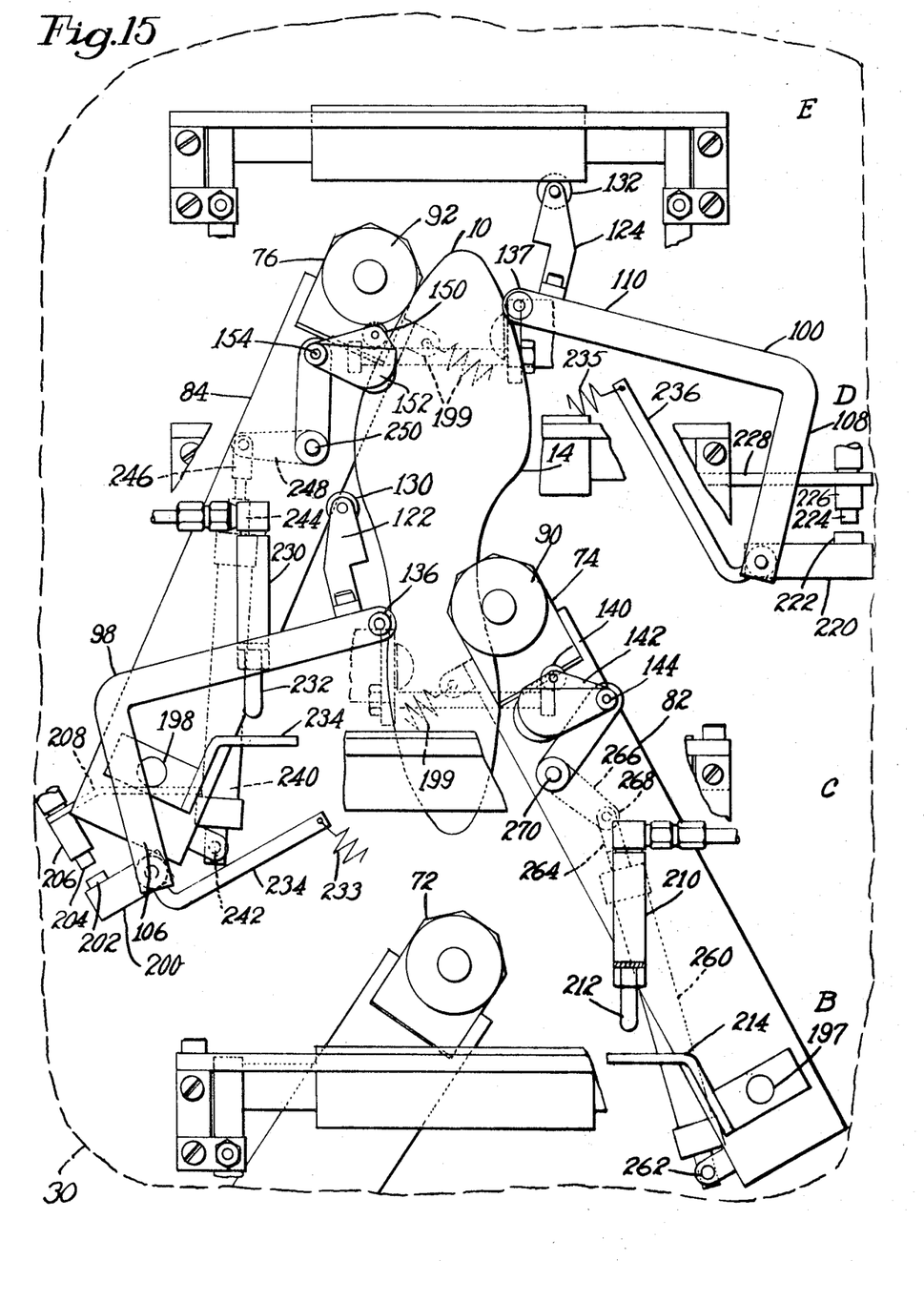
FIG. 15 is a partial plan view, with various parts broken away, others by representation and others in phantom showing a second pair of reducing tools in a double reduction adaptation of the finishing machine operating relative to an unattached sole.

The drawing of FIG. 15 shows the end section of the machine where the second reduction is carried out relative to unattached sole 10. The same drawing lends itself to consideration relative to a single selective reduction embodiment or adaptation of the machine. That may be accomplished in a number of ways, as by having the reduction tools to be described as a single pair of rotatable reduction tools carried by the machine, or by having the first pair of rotatable reduction tools, previously described as a first stage set in an inoperable position, etc. Returning to double reduction embodiment, sole 10 advances through the machine to the point where rotatable tool 74 and specifically tool head 90 performs the reduction operation, or makes cutting contact, while rotatable tool 76 does not, but rather responsive to edge gage 150 follows the edge of the sole, in the forepart of the same with tool head 92 out of cutting contact with the marginal portion of the sole 10.

Rotatable tools 74 and 76 are spring tensioned to bear inwardly in the manner described immediately above with respect to rotatable tools 70 and 72. Rotatable tool 74 includes arm 82 which is carried on and swings transversely or laterally relative to standing shaft 197. Rotatable tool 76, in similar fashion, includes arm 84 positioned on shaft 198. In order then to allow the tools 74 and 76 to swing back the full width of the sole 10 while following the same, releasing mechanisms are provided for each, which cooperate with their counterpart, pressure equalizing means; specifically in this regard, tool 74 cooperates with pressure equalizing means 98 and tool 76 cooperates with pressure equalizing means 100.

Referring to the arrangement provided between tool 74 and pressure equalizing means 98 first: pressure equalizing means 98, includes an outwardly projecting finger 200 carrying a pad 202 at the rear end of arm 106. As pressure equalizing means 98 is swung sideways as a result of sole 10 contacting the same, pad 202 is drawn back from nozzle 204 of air line 206 which is in turn secured to a stationary frame member, not shown, by support means 208. When pad 202 is drawn back, the air circuit in air line 206 is broken effecting the cooperating piston 210 which is attached to the machine frame. As a result, the piston rod 212 of piston 210 retracts, and draws away from the stop 214 stationed on tool arm 82. When the sole 10 has passed beyond tool 74, the latter presses inwardly to its original position allowing thee air circuit to close and in turn allowing the reducing tool 74 and cooperating pressure equalizing means 98 to be reset for the next sole to pass through the machine.

A similar arrangement is shown with respect to rotatable reducing tool 76 and cooperating pressure equalizing means 100. Pivot arm 108 of equalizing means 100 carries an outwardly directed finger 220 and pad 222 which swings back and away from nozzle 224 carried on air line 226, the latter secured to a stationary frame member, not shown, by support means 228. Breaking the air circuit in air line 226 affects the operation of piston 230, causing piston rod 232 to retract away from the stop 234 carried on tool arm 84.

Pressure equalizing means 98 is tensioned inwardly through use of spring 233 attached at one end to arm 234 which is in turn connected to equalizing means 98, and, at the other end to a stationary frame member, not shown. A similar arrangement obtains with respect to pressure equalizing means 100 through the use of spring 235 attached to arm 236 and anchored at the other end to a stationary frame member, not shown.

FIG. 15 shows the arrangement of parts by which in the first instance, a tool head 92 is maintained out of cutting contact with the forepart of a sole 10, and, in the second instance, a tool head 90 which is in cutting contact with sole 10. Following that order then, the biased movable tool arm 84 on which rotatable tool 92 is mounted, carries an air cylinder 240 attached through a pivot linkage 242. The cylinder 242 is shown with piston rod 244 extended forwardly. The piston rod 244 attaches through link 246 to bell crank 248 pivotally mounted on pin 250. The forward arm portion of bell crank 248 carries the tool guard 150 pivotally mounted, along with sole gage 152 which is rotatably mounted on the tool gage. With the piston rod extended in the manner indicated, the leading arm portion of bell crank 248, pivots inwardly incidentally directing the tool guard 152 inwardly to a position where it interferes with the rotatable tool head 92 making effective cutting contact with the sole 10.

As shown there, rotatable tool 74, by contrast is in cutting contact with sole 10. Air cylinder 260 attached to arm 82 by pivot linkage 262 is shown with piston rod 264 in the retracted position. As a result, bell crank 266, attached to piston rod 264 by linkage 268, has its leading arm pivoted outwardly on pin 270. As a result the tool guard 142, carried by the bell crank 266 is swung outwardly or is displaced and in that position allows cutting head 74 to move inwardly and into cutting contact with sole 10. The retraction of piston rod 264 is initiated in response to the sole gage 140 having registered with ball point 14 of sole 10.

Figure 16:
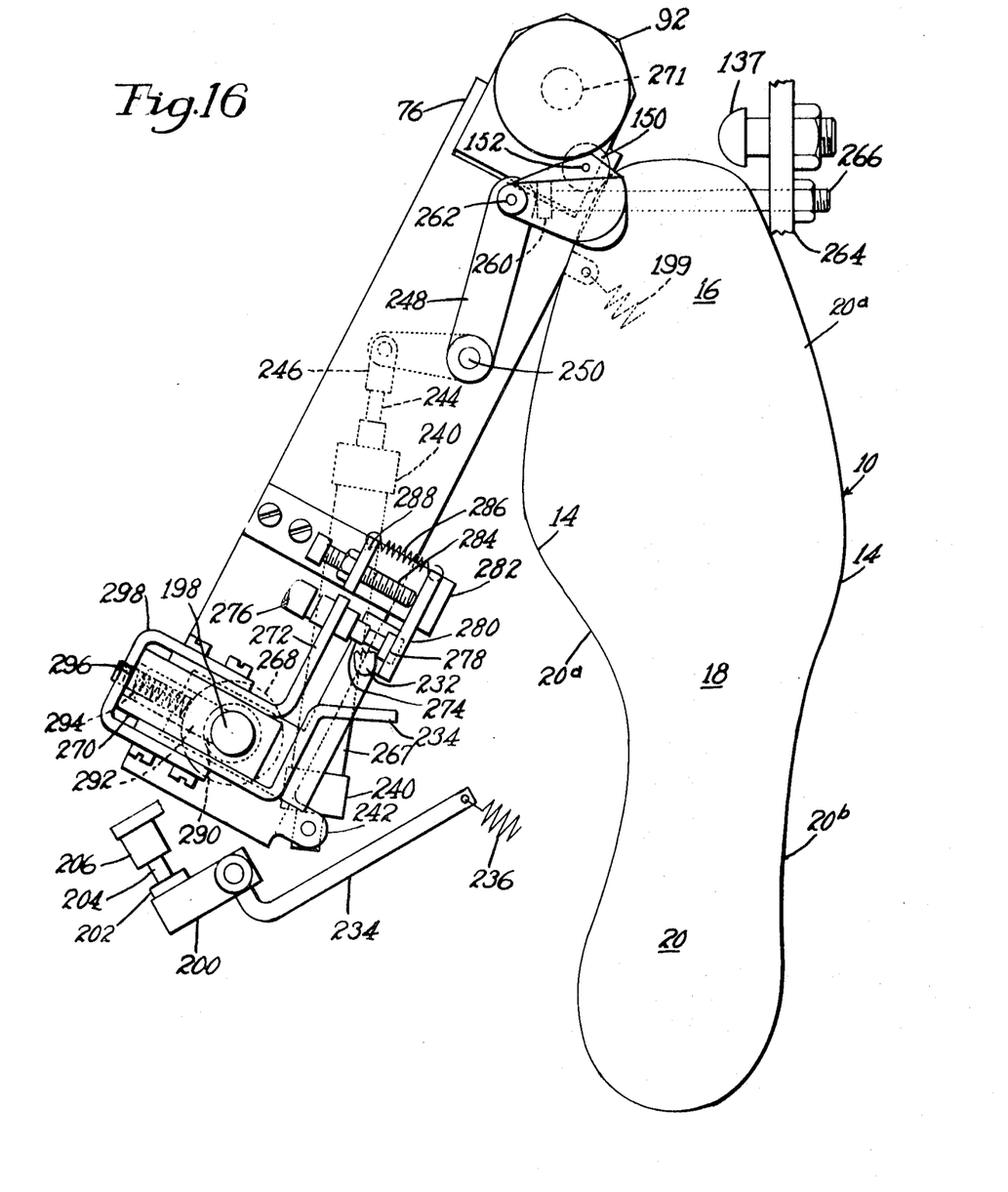
FIG. 16 is a partial plan view, with parts broken away and other parts in phantom showing the biased arm carrying a cooperating rotatable tool, sole edge gage and tool guard assembly, with the rotatable tool positioned out of finishing contact with a reference sole.

Reference is now made to FIGS. 16, 17, 18 and 19 in which rotatable tool 76 is shown in operation relative to providing selective reduction to a sole 10. Sole 10 is shown at FIG. 16 in position where the forepart 16 is in registration with sole gage 150 and as a result is out of cutting contact with reducing head 92 which is carried on shaft 271 driven by an air motor, not shown. In the second, FIG. 17, sole 10 has been in effect advanced to a position beyond that shown in FIG. 16 to where forepart 16 is out of registration with sole gage 150, the latter having been passed by the ball point 14 of sole 10.

As sole 10 advances it acts as a template, with arm 76 carrying cutting head 92 following the edge contour of the same as a result of the arm 76 being biased inwardly under tension as previously described. At the outset, that is, over the forepart of sole 10, cutting head 92 is retained out of cutting contact with the sole 10 by tool guard 152 which is in effective interposing position between cutting head 92 and sole 10 in response to sole gage 150 registering on the sole edge at the forepart of the sole. As shown in FIG. 16 this involves the air cylinder 240 driving forward piston 244 carrying head 246, to cause bell crank 248 to pivot its leading arm inwardly relative to pivot point 250, the bell crank 248 in turn carrying the tool guard 152 and sole guide 150. In addition to that, for convience in accommodating soles having various toe shapes and prevent head 92 from swinging over the line of travel, which could cause machine jamming, an abutment 260 is provided against which bell crank 248 rests at the time of initial contact between sole edge gage 150 and sole 10. The abutment 260 is carried as the head of a bolt attached to frame member 264 by means of fastener 266. Contact between abutment 260 and bell crank 248 is effected only when sole guard 152 is operational or positioned in the manner shown in FIG. 16.

Figure 17:
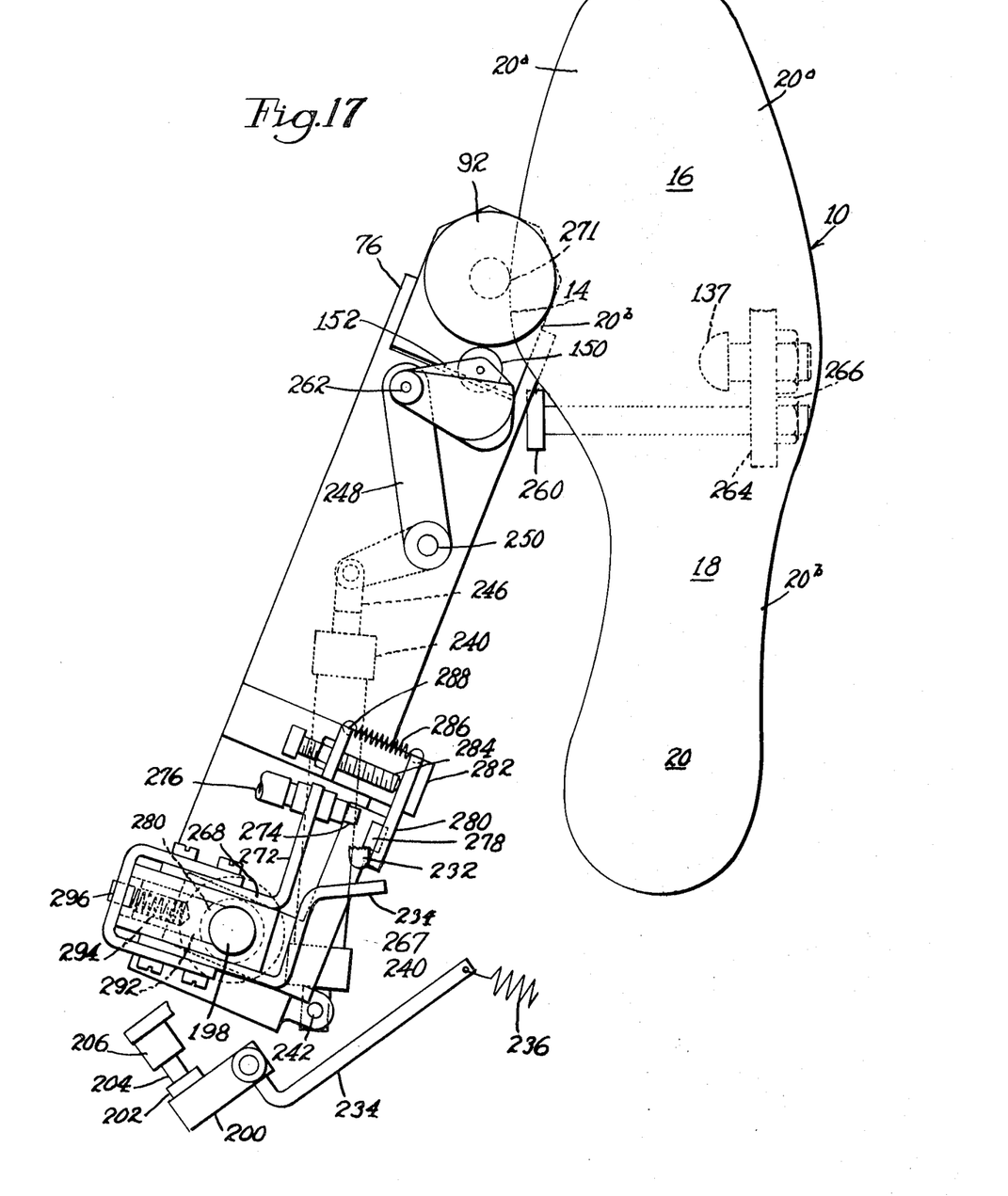
FIG. 17 is a partial plan view corresponding to that of FIG. 16 but with the rotatable tool positioned in finishing contact with the reference sole.
Figure 18:
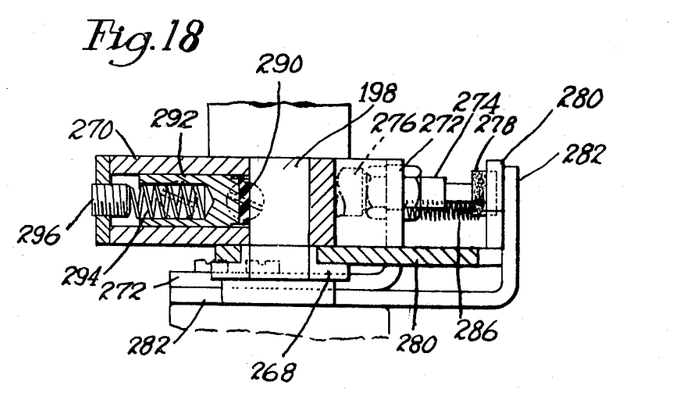
FIG. 18 is a partial elevational view, in section, with parts broken away taken along the line XVIII—XVIII of FIG. 16.
Figure 19:
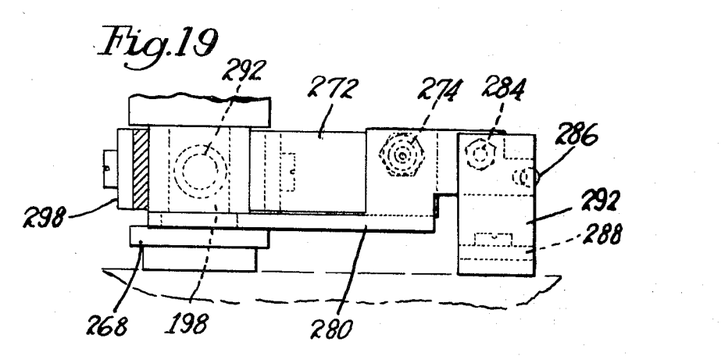
FIG. 19 is a partial elevational view in section, with parts broken away taken along the line XIX—XIX of FIG. 16.

As indicated specifically at FIG. 17 the rotatable reducing head 92 is in cutting contact with the sole 10 as a result of the sole being advanced to the extent that the ball point 14 is advanced beyond sole edge gage 150. The piston 244 being retracted by air cylinder 240 causes bell crank 248 to pivot outwardly and position the tool guard 152 out of the interfering position allowing reducing head 92 to make cutting contact with sole 10.

The registration of sole edge gage 150 with ball point 14 or rather the subsequent breaking off of that registration as a result of the sole edge contouring inwardly and away from the gage 150 serves to initiate operation of the assembly which results in tool guard 152 becoming displaced to allow reducing head 92 to press inwardly and make cutting contact with sole 10. This is facilitated by a mechanism operating on a lag basis which translates the information regarding the change in contour of the sole following or aft of the ball point 14, and, respond to the same to initiate the assembly with the resulting displacement of the tool guard 152 taking place. The arrangement and operation of this expedient is shown in detail in FIGS. 16–19. As shown there yoke member 267 and bearing member 268 are carried on shaft 198 interposed between tool arm 76 and follower mechanism 270 both of which are also carried on the shaft 198. The mechanism 270 is designed to pivot outwardly at the same rate or in registration with arm 76, and to lag or hesitate in pivoting inwardly, relative to arm 76 doing so in response to the edge contour of sole 10 narrowing or changing to an inward direction following or aft of ball point 14. Mechanism 270 carries stop 234, which latter serves incidentally as a reset for a related pressure equalizing means, not shown. The pivotable follower mechanism 270 includes a forwardly projecting member 272 through which is connected an inwardly directed nozzle 274 terminating air line 276. Nozzle 274 is designed to be closed onto pad 278 positioned on arm 280 which is carried on bearing member 268. An adjustment screw 284 together with tension spring 286 serve to locate arm 280 relative to reference plate 288 attached to stationary member 282 in turn attached to arm 76. The adjustment screw 284 may be set to affect the precise point at which cutting head 92 makes cutting contact with sole 10 relative to ball point 14. When, as shown in FIG. 16, contact between nozzle 274 and pad 278 is maintained, cylinder 240 is activated so as to position piston 244 in the extended position. By contrast, as shown in FIG. 17, when contact is broken due to the hesitance or lag in the reaction of follower mechanism 270 to pivoting back inwardly, pad 278 becomes separated from air hose nozzle 274 and cylinder 240 responds to retracting piston 244.

The lag characteristic of pivotable follower mechanism 270 is provided for by the inclusion of friction pad 290 which contacts shaft 198. Block 292 is pressed inwardly against pad 290 by a backing spring 294 and adjustable pin 296, the latter threaded through loop member 298 attached to follower mechanism 270. This arrangement serves to allow adjustment of friction contact between pad 290 and shaft 198.

As the forepart of sole 10 passed through with sole edge gage 150 registering on the edge of the same the gage 150 together with cooperating tool guard 152 continues to move or pivot outwardly because the width of the sole 10 continues to increase up to the ball point 14. As gage 150 moves outwardly the arm 76 responds and swings outwards, pivoted on shaft 198 as does follower mechanism 270. During the outward movement by those parts, pad 278 remains in closed relationship with nozzle 274, as shown in FIG. 16. When the sole gage 150 passes the ball point 14, and starts into the arch portion 16 of sole 10 the sole edge gage 150 loses registration with the edge of sole 10, and arm 76 swings inwardly caused by its being tensioned in the inward direction. At the same time pivotable follower mechanism 270 which is held in frictional contact through friction pad 290 bearing on shaft 198 is not responsive to the change in inward direction, as is arm 76. As a consequence pad 278 which is indirectly attached to arm 76 is drawn away from pad 274. This breaks the air circuitry in air line 276 causing a drop in the air pressure, which activates air cylinder 240 to retract piston 244 causing eventually the repositioning or displacement of tool guard 152 from the position shown in FIG. 16 to that shown in FIG. 17. This results in reducing head 92 which is rotating on shaft 271 making cutting contact initiated relative to ball point 14, and continuing over the arch portion 16 and heel portion 18 of sole 10, to provide selective reduction of the nature shown as marginal portion 20b as shown in FIG. 7 or marginal portion 20c as shown in FIG. 10.

After the sole 10 has passed through, the arm 76 swings completely inward. This causes piston 232 to strike stop 234 resetting the cooperating pressure equalizing means. At the same time, the pivotable follower mechanism 270 will have done the same, allowing pad 278 to close with nozzle 274. With the resulting build up of air pressure in line 276, the tool guard 152 is reset to the position shown in FIG. 16.

The finishing machine of the present invention is designed to operate on unattached soles which are produced from a number of organic materials, including leather, rubber and synthetic polymeric materials. Also intended are the various composition soles which are combinations of the various materials exemplified above together with paper, etc. Other soles are those produced by impregnating a matrix such as paper etc. with natural or synthetic polymeric materials.

In operation, the finishing machine is automatic, designed to operate continuously on any number of unattached soles fed to the same by an operator. Actual operation involves setting the various pneumatic, mechanical and electrical power circuitry in operating positions and, setting the advance rolls with proper clearance between each pair, drive and backing roll, in order to advance the soles to be finished by the machine. This is followed by loading of the desired number of soles to be finished onto the automatic stack feeder carried at the initiating end of the machine. The machine automatically feeds the soles individually and in sequence into the machine which automatically advances them through the finishing operations or stages of the machine, as for example, in the double reducing embodiment, through a first pair of reducing tools which provide the soles with a first reduction with respect to the lengthwise margin, margins or marginal portions of each of the soles. Following that the machine automatically advances the soles, individually and in sequence, through a second pair of reducing tools which provide the soles with a second selective reduction initiated relative to the ball points of the soles, and continuing over the arch and heel marginal portions of each of the soles.

It will thus be seen that the objects set forth above, among those made apparent from the preceding description, are efficiently attained, and, since certain changes may be made in carrying out the above machine, process and product set forth without departing from the scope of the invention, it is intended that all matter contained in the above description or shown in the accompanying drawings shall be interpreted as illustrative and not in a limiting sense.

Having thus described my invention what I claim as new and desire to secure by Letters Patent of the United States is:

1. A machine for multiple finishing marginal portions of an unattached shoe sole in which at least one of the finishing operations is introduced to selected marginal portions initiated relative to a ball point of the sole, the machine having a base plate, means for moving soles one at a time along the base plate on a line of travel passing through a first and second pair of rotatable finishing tools mounted at opposite sides of the base plate and inwardly biased for operation on opposite sides of the sole, pressure equalizing means mounted opposite to the finishing tools to counteract the pressure generated against the sole transversally of the line of travel passing between the finishing tools and the pressure equalizing means, each of the first pair of finishing tools disposed to provide a first finishing operation on the marginal portion extending substantially the overall length of the sole and each of the second pair of finishing tools cooperating with actuating means responsive to the edge of the sole for movement of the finishing tool into operating contact with the sole to provide a second finishing operation on selected marginal portions of the sole initiated relative to a ball point of the sole.

2. A machine according to claim 1 wherein the actuating means includes a tool guard and a cooperating sole edge gage, the tool guard being positionable to maintain the finishing tool out of operating contact with the marginal portion of the sole while the cooperating sole gage registers on a forepart edge of the sole.

3. A machine according to claim 2 wherein the tool guard maintains the finishing tool out of operational contact with the sole responsive to the cooperating sole gage moving outwardly in registration with the sole edge at the sole forepart.

4. A machine according to claim 2 wherein the tool guard is positioned between the finishing tool and the sole maintaining the finishing tool out of operating contact with the marginal portion of the sole, the tool guard being responsive to the cooperating sole gage registering on the sole edge at the sole forepart.

5. A machine according to claim 4 wherein the tool guard is displaceable in response to the cooperating sole gage losing registration with the sole edge at a ball point of the sole, allowing the finishing tool to come into operational contact with the sole.

6. A machine according to claim 1 adapted for sole reduction, wherein the rotatable finishing tools are rotatable reducing tools.

7. A machine for finishing marginal portions of an unattached shoe sole at selected marginal portions initiated relative to a ball point of the sole, comprising a base plate, means for moving soles one at a time along the base plate in a path of travel passing through a pair of rotatable finishing tools mounted at opposite sides of the base plate and inwardly biased for operation on opposite sides of the sole, pressure equalizing means mounted opposite to the finishing tools to counteract the pressure generated against the sole transversally of the line of travel passing between the finishing tools and the pressure equalizing means, the finishing tools cooperating with actuating means responsive to the edge of the sole for movement of the finishing tools into operating contact with the sole and thereby provide a finishing operation on selected marginal portions of the sole initiated relative to a ball point of the sole.

8. A machine according to claim 7 wherein the actuating means includes a tool guard and a cooperating sole edge gage, the tool guard being positionable to maintain the finishing tool out of operating contact with the marginal portion of the sole while the cooperating sole gage registers on a forepart edge of the sole.

9. A machine according to claim 8 wherein the tool guard maintains the finishing tool out of operational contact with the sole in response to the cooperating sole gage moving outwardly in registration with the sole edge at the sole forepart.

10. A machine according to claim 8 wherein the tool guard is located between the finishing tool and the sole maintaining the finishing tool out of operating contact with the marginal portion of the sole, the tool guard being responsive to the cooperating sole gage registering on the sole edge at the sole forepart.

11. A machine according to claim 8 wherein the tool guard is displaceable in response to the cooperating sole gage leaving off registration with the sole edge at a ball point of the sole, allowing the finishing tool to come into contact with selected margins of the sole.

12. A machine according to claim 7 adapted for sole reduction wherein the rotatable finishing tools are rotatable sole reducing tools.

13. A finishing tool assembly for a through feed machine adapted to provide finishing at a selected margin of an unattached sole, the selected margin initiating relative to a ball point of the sole, the said finishing tool assembly comprising a rotatable finishing tool and cooperating displaceable tool guard and sole edge gage mounted on an inwardly biased arm, the sole edge gage being registrable on the sole forepart edge, the said tool guard being displaceable in response to the sole edge gage passing aft the ball point of the sole.

14. A finishing tool assembly according to claim 13 wherein the sole edge gage is carried by the tool guard.

15. A finishing tool according to claim 13 wherein the finishing tool is a sole reducing tool.

16. A machine for multiple finishing marginal portions of an unattached shoe sole in which at least one of the finishing operations is introduced to selected marginal portions initiated relative to a ball point of the sole, the machine having a base plate, means for moving soles one at a time along the base plate on a line of travel passing through a first and second pair of rotatable finishing tools mounted at opposite sides of the base plate and inwardly biased for operation on opposite sides of the sole, pressure equalizing means provided to counteract the pressure transverse to the line of travel by each of said finishing tools, each of the first pair of finishing tools disposed to provide a first finishing operation on the marginal portion extending substantially the overall length of the sole, and each of the second pair of finishing tools cooperating with actuating means responsive to the edge of the sole for movement of the finishing tool into operating contact with the sole to proivde a second finishing operation on selected marginal portions of the sole initiated relative to a ball point of the sole.

17. A machine for finishing marginal portions of an unattached shoe sole at selected marginal portions initiated relative to a ball point of the sole, comprising a base plate, means for moving soles one at a time along the base plate in a path of travel passing through a pair of rotatable finishing tools mounted at opposite sides of the base plate and inwardly biased for operation on opposite sides of the sole, pressure equalizing means provided to counteract the pressure transverse to the line of travel by each of said finishing tools, the finishing tools cooperating with actuating means responsive to the edge of the sole for movement of the finishing tools into operating contact with the sole and thereby provide a finishing operation on selected marginal portions of the sole initiated relative to a ball point of the sole.

References Cited

UNITED STATES PATENTS

| | | | |
|---|---|---|---|
| 2,577,371 | 12/1951 | Small | 12—146 |
| 2,936,535 | 5/1960 | Heider | 36—25 |
| 2,943,337 | 7/1960 | Sweeney | 12—89X |
| 3,119,133 | 1/1964 | Smalley et al. | 12—17 |
| 3,186,013 | 6/1965 | Glassman et al. | 12—146 |
| 3,298,048 | 1/1967 | Dziki et al. | 12—17 |
| 3,331,147 | 7/1967 | Isaacson | 36—25 |
| 984,883 | 2/1911 | Blair | 12—90 |
| 1,921,165 | 8/1933 | Morrill | 12—90X |

PATRICK D. LAWSON, Primary Examiner

U.S. Cl. X.R.

12—90, 146; 36—25